(12) United States Patent
Sjoblom

(10) Patent No.: US 7,310,331 B2
(45) Date of Patent: Dec. 18, 2007

(54) ORDERED DELIVERY OF INTERCEPTED DATA

(75) Inventor: Kai Sjoblom, Espoo (FI)

(73) Assignee: Nokia Corporation, Espoo (FI)

( * ) Notice: Subject to any disclaimer, the term of this patent is extended or adjusted under 35 U.S.C. 154(b) by 858 days.

(21) Appl. No.: 10/083,680

(22) Filed: Feb. 25, 2002

(65) Prior Publication Data

US 2002/0150096 A1 Oct. 17, 2002

Related U.S. Application Data

(63) Continuation of application No. PCT/EP99/06582, filed on Sep. 7, 1999.

(51) Int. Cl.
*H04L 12/66* (2006.01)
*H04L 12/28* (2006.01)

(52) U.S. Cl. .................. 370/353; 370/394; 726/12; 709/224

(58) Field of Classification Search .................. None
See application file for complete search history.

(56) References Cited

U.S. PATENT DOCUMENTS

| | | | |
|---|---|---|---|
| 5,101,402 A | | 3/1992 | Chiu et al. |
| 6,009,177 A | * | 12/1999 | Sudia .................. 713/191 |
| 6,122,499 A | * | 9/2000 | Magnusson ............ 455/405 |
| 6,651,099 B1 | * | 11/2003 | Dietz et al. ............ 709/224 |
| 6,678,270 B1 | * | 1/2004 | Garfinkel .............. 370/392 |
| 6,738,902 B1 | * | 5/2004 | Ruppert et al. ......... 713/162 |
| 2003/0078041 A1 | * | 4/2003 | Dikmen et al. ........ 455/433 |

FOREIGN PATENT DOCUMENTS

| | | |
|---|---|---|
| WO | 9742784 | 11/1995 |
| WO | 9852337 | 11/1998 |
| WO | 9917499 | 4/1999 |

OTHER PUBLICATIONS

"Law Enforcement and Mobile Communications" by R.R. Thorogood IEE Colloquium on Communications Towards the Year 2000, Jan. 1, 1996, the whole document.

(Continued)

*Primary Examiner*—Duc Ho
(74) *Attorney, Agent, or Firm*—Ware, Fressola, Van Der Sluys & Adolphson, LLP

(57) ABSTRACT

A method for performing a lawful interception in a packet network comprises the steps of generating (S2) interception related information packets from a communication to be intercepted; generating (S2) communication content packets from a communication to be intercepted; providing (S3) identification data for the interception related information packets and for the communication content packets of one group of communication packets; providing (S5) ordering data for each of the interception related information data packets and for each of the communication content packets; and transmitting (S6) the interception related information packets, the communication packets, the identification data and the ordering data to an interception authority device. By this measure, a missequenced reception of interception related information (IRI) packets and communication content (CC) packets can be avoided. Also, the assembly of IRI packets between corresponding CC packets is possible by a corresponding LEMF of the interception authority.

34 Claims, 6 Drawing Sheets

OTHER PUBLICATIONS

"Digital cellular telecommunications system (Phase 2 +); Numbering, addressing and identification;" Global System for Mobile Communications (GSM); European Telecommunications Standards Institute; ETS 300 927, Oct. 1998.

"Digital cellular telecommunications system (Phase 2 +); Lawful Interception; Stage 2;" Global System for Mobile Communications (GSM); European Telecommunications Standards Institute; GSM 03.33 V7.1.0 (Jul. 1999).

"Telecommunications security; Lawful Interception (LI); Handover interface for the lawful interception of telecommunication traffic;" European Telecommunications Standards Institute; Draft ES 201 671 V1.1.1 (May 1999).

* cited by examiner

ORDERED DELIVERY OF INTERCEPTED DATA

CROSS-REFERENCE TO RELATED APPLICATION

This application is a continuation of International Application PCT/EP99/06582 having an international filing date of Sep. 7, 1999 and from which priority is claimed under all applicable sections of Title 35 of the United States Code including, but not limited to, Sections 120, 363 and 365(c).

FIELD OF THE INVENTION

The present invention relates to a method and a system for performing a lawful interception in a packet network.

BACKGROUND OF THE INVENTION

The provision of a lawful interception is a requirement of national law, which is usually mandatory. From time to time, a network operator and/or a service provider will be required, according to a lawful authorization, to make results of interception relating to specific identities available to a specific intercepting authority or Law Enforcement Agency (LEA).

There are various aspects of interception. The respective national law describes under what conditions and with what restrictions interception is allowed. If an LEA wishes to use lawful interception as a tool, it will ask a prosecuting judge or other responsible body for a lawful authorization, such as a warrant. If the lawful authorization is granted, the LEA will present the lawful authorization to an access provider which provides access from a user's terminal to that network, to the network operator, or to the service provider via an administrative interface or procedure. When a lawful interception is authorized, an Intercept Related Information (IRI) and/or the content of the corresponding communication (CC) is delivered to the LEA.

The lawful authorization may describe the IRI and the content of the communication that are allowed to be delivered for this LEA; typically, the interception period and interception target (e.g., a person's name or MSISDN number(s) related to SIM card(s) or IMEI code of a mobile terminal). For different LEAs and for different investigations, different constraints can apply that further limit the general borders set by the law. The interception target may also be described in different ways in a lawful authorization, e.g. subscriber address, physical address, location, services etc.

Such a lawful interception functionality is also needed in the packet switched part of new mobile data networks such as the GPRS and the UMTS.

Lawful interception is based on an EU Council resolution, which concerns all telecommunications systems, not only mobile ones. The European Telecommunications Standards Institute (ETSI) has defined further technical requirements. These requirements define three interfaces:

X0_1 (=HI1): administrative tasks (may be on paper or fax or online or otherwise)
X0_2 (=HI2): network signaling (near real time)
X0_3 (=HI3): intercepted user data (near real time)

The interface X0_1 carries interception requests, authorization documents, encryption keys and the like. The interface X0_2 carries IRI (Interception Related Information) like phone numbers, service information, time stamps etc. The interface X0_3 carries the content of communication (CC), i.e., the intercepted packets containing data sent and/or received etc. The exact definitions of the three interfaces are left to local legislation and authorities. The interfaces X0_1 to X0_3 are referred in the GSM 03.03 (where GPRS annex was included June 1999). The three X0 interfaces are defined in ETSI ES 201 671 V1.1.1 as HI1/HI2/HI3 interfaces, wherein symbols X0_1 to X0_3 correspond to HI1 to HI3, respectively.

With respect to FIG. 1, the lawful interception is described in more detail. FIG. 1 shows a reference configuration for the lawful interception for GPRS (General Packet Radio Systems). Reference numeral 1 denotes a Law Enforcement Agency (LEA) mentioned above. The symbols X0_1, X0_2 and X0_3 denote the above mentioned interfaces between the LEA and respective network elements which are described in the following. Numeral 2_1 denotes an Administrative Function for LI (Lawful Interception) in the network. Numeral 2_2 indicates an IRI delivery function (also known as DF2P for packet data like GPRS), whereas numeral 2_3 indicates a CC delivery function (also known as DF3P for packet data). The ADMF 2_1, the IRI delivery function 2_2 and the CC delivery function 2_3 are connected to a GSN (GPRS Support Node) 3 via interfaces X1_1p, X2p and X3p. In addition, the IRI and CC delivery functions are connected with the ADMF 2_1 via interfaces X1_2p and X1_3p, respectively. The GSN 3 can be a SGSN or a GGSN or other node intercepting user activity or frames containing user level packet data.

In this manner, the ADMF 2_1 is used together with the delivery functions to hide from the GSN that there might be multiple activations by different Law Enforcement Agencies (LEAs) on the same target. Additionally, the packet network complexity is hidden from the LEA(s).

The above described LI structure works satisfactorily in case of circuit switched services like GSM. However, the situation is different for packet switched services like GPRS.

That is, in case of a packet switched services, the IRI and CC data are transmitted in packets to the LEA 1. The packet flow starts from the packet intercepting node (i.e., GSN 3 in FIG. 1) to the delivery function nodes (i.e., IRI and CC delivery functions 2_2 and 2_3 in FIG. 1) to the LEA 1. The LEA system has a mass memory for packets, but it may also monitor packets as near real time streams. In GPRS, for example, the IRI data is defined to have some network attachment and/or PDP (Packet Data Protocol) context related data incorporated that relates the IRI to certain subscriber activity. The packets relate to a certain PDP context.

In the packet switched networks as described above, there is a possibility that due to delay changes in the networks, e.g., because of handovers, packets are received in a different order than they were sent. In other words, user data (CC) relating to a single communication session (PDP context in GPRS networks) may be routed via different nodes towards a delivery function and finally to the LEA due to handovers (like SGSN handovers in GPRS networks) or Network Element (NE) redundancy cases where NE2 takes over the responsibility of another NE1 of similar kind, due to capacity or NE failure reasons. Hence, it is possible that the packets (either IRI or CC) sent from the SGN 3 to the LEA will arrive in a different order than that in which they were actually sent.

It is known that packets can be numbered to allow the reconstruction of the actual packet order. However, in Lawful Interception (LI) it may not be enough to only reconstruct the actual order of packets itself. By contrast, it is also important to know which IRI packets relates to which CC packet. Since IRI packets and CC packets are transmitted via logically separate connections to the LEA and the number of CC and IRI packets are typically not 1:1, it is difficult to relate the two kinds of packets to each other in an efficient way. Hence, if in LI such delays and misorders of IRI and/or CC packets occur, this will cause serious problems since organizing the packets afterwards into a correct order is a more complicated task than getting them in an easily identifiable order from the first possible point.

Document WO 99 17499 A discloses a method of performing a lawful interception in a packet network. This method comprises the steps of generating interception related information packets and communication content packets from a communication or network activity to be intercepted, providing identification data for the packets and transmitting the packets to an interception authority device.

SUMMARY OF THE INVENTION

The object underlying the invention resides in providing a method and a system by which missequenced information packets can be avoided.

According to the invention, this object is solved by a method for performing a lawful interception in a packet network, which comprises the steps of:

generating interception related information packets from a communication to be intercepted;

generating communication content packets from a communication or network activity to be intercepted;

providing identification data for the interception related information packets and for the communication content packets of one group of communication packets;

providing ordering data for each of the interception related information data packets and for each of the communication content packets; and transmitting the interception related information packets, the communication packets, the identification data and the ordering data to an interception authority device.

Alternatively, the above object is solved by an interception system that comprises at least one first network element for intercepting a communication; and at least one interception authority device; wherein the first network element comprises a first packet generating means for generating interception related information packets from a communication to be intercepted;

a second packet generating means for generating communication content packets from the communication to be intercepted;

an identification data generating means for generating an identification data for the interception related information packets and the communication content packets associated to the communication or network activity;

a first ordering data generating means for providing ordering data for each of the interception related information data packets;

a second ordering data generating means for providing ordering data for each of the communication content packets; and a transmitting means for transmitting the interception related information packets and the communication content packets including the correlation data to the interception authority device.

Thus, by the method and the system according to the invention, the received IRI and CC packets can easily be put in the correct time order.

Therefore, performance increases in the receiving end system, i.e., the Lawful Enforcement Monitoring Facility (LEMF) of the LEA, as less operation load is necessary for determining the correct order of the packets received.

Furthermore, the reliability of the detected communication content (CC) increases, since the order of the CC packets is correct.

Moreover, also missing or duplicated IRI and CC packets can be noticed. Time stamps would not alone show LEA if some packets were lost. Additionally, time stamp decoding consumes more processing power than sequence number checking.

In addition, the assembly of IRI packets between corresponding CC packets is possible by LEMF. That is, although IRI and CC packets are transmitted via logical separate channels, the LEMF can recognise the exact order and correlation of IRI and CC packets to each other.

Now e.g. the problems relating to handovers of intercepting nodes (such as SGSNs in GPRS) and the asynchronous transmission of those packets through the network between the intercepting nodes and the DF/LEA system(s), and the possible unpredictable time order of e.g. the packets sent near a intercepting node handover could be avoided without much extra processor work. Furthermore, the LEMF can this way detect lost or duplicated IRI/CC packets (such situations could arise in redundancy cases when a NE2 (second network element) takes over the tasks of a NE1 (first network element) due to a NE1 failure or due to capacity or other reasons). Also, the relation of IRI packets and the corresponding CC packets could be based on this same numbering, resulting in better processor efficiency than e.g. inspecting the higher layer protocol packet numberings which could even vary and be in future something else than was in use in that time the current design of the LI system was done.

In most time measurement cases in telecommunication, the precision is limited, e.g., to 1 second. Then it could occur that two or more packets get the same time stamp (or a very, very precise but also very processor inefficient time keeping system would be needed).

Sequence numbers also offer in this respect a better way for providing packets.

Further advantageous developments are set out in the dependent claims.

In particular, the identification data can be used for identifying interception related information (IRI) packets and for identifying the communication content (CC) packets of the communication, and the ordering (sequence number) data can be used for ordering the IRI packets and the CC packets. As mentioned above, the process for putting the packets in the correct time order can be simply performed by rearranging the received packets in a suitable memory.

The identification data can be a session identification data. Specifically, in case the network is a GPRS packet network, the CC session identification data can be obtained from the PDP context table of the serving GSN and the IRI identification data for a user can be retrieved from the GPRS attached mobiles of the serving SGSN and/or PDP contest data of a serving GSN.

The ordering data can be integer numbers which are incremented for each sequential packet. Hence, a sequential order can easily be provided. The sequential number should have an enough large maximum value, e.g. $2^{64}$. The maximum sequence number would be reached only after an extremely long time period, and then it could be allowed to start from 0 again, as the LEA would no longer have the older packets as uninspected. (Those packets would have been deleted using, e.g., an automatic timeout or deletion policy (by LEMF) for very old sequence numbers.) For completeness, the newest packets overlapping the maximum sequence number could have a flag to indicate (in record sequence number order comparison situations) that they are newer (greater) than the old tail of sequence numbers that is after a sequence number range overflow only approaching the overflow situation.

Furthermore, a time stamp could even be provided to each IRI packet and/or to each CC packet. The time stamp can have a precision of one second, for example, or any other suitable value. By this measure, only a limited number of ordering data is necessary. In particular, by using this time stamp also the flag mentioned above could be omitted.

Moreover, for each IRI packet and each CC packet, a frame can be provided in which the identification data and the ordering data can be included. In addition, if a time stamp is provided, also the time stamp can be included in the frame. By this measure, the packets are provided with a unique format in which all necessary values and identifiers can easily be read at the packet receiving side.

BRIEF DESCRIPTION OF THE DRAWINGS

The present invention will be more readily understood with reference to the accompanying drawings in which.

DETAILED DESCRIPTION OF PREFERRED EMBODIMENTS

In the following, a preferred embodiment of the invention is described in more detail with reference to the accompanying drawings.

Figure 1:
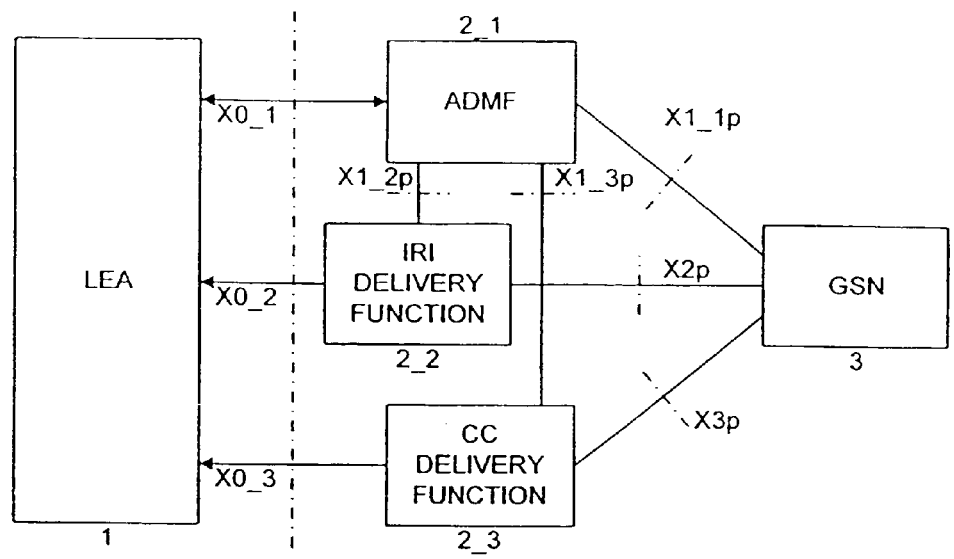
FIG. 1 shows schematically a network system comprising a LEA and an interception node of a network, to which the invention can be applied.

FIG. 1 shows a network system to which the embodiment is applicable. Since FIG. 1 has already been described in the introductory part, an unnecessary repetition is omitted here. However, it is noted that the interception node, i.e., the GSN 3, and the LEA 1 are modified according to the embodiment, as will be described later.

According to the invention, the IRI packets (relating to intercepted packet switched communication content or circuit switched communication content) are sequence numbered, e.g. by starting from 0 and incrementing packet by packet. Similarly, the CC packets related to a certain communication session (e.g. PDP context in GPRS), are sequence numbered. Thus the IRI packets IRI0, IRI1, IRI2, ... IRIn received by the IRI and CC delivery functions 2_2 and 2_3 and/or LEA 1 (relating to a certain communication session) appear in an order, from which the actual communication content (CC) data can be taken by the LEA 1 in the correct order. The same applies to the CC packets CC0, CC1, CC2, ... CCm that relate to a certain communication session.

Figure 2:
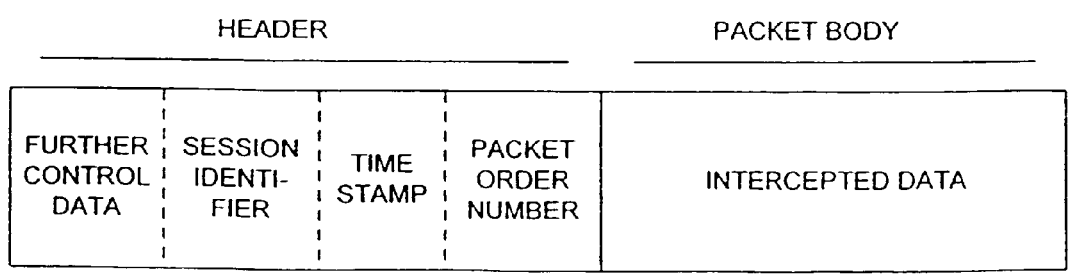
FIG. 2 shows schematically the structure of an IRI or CC packet according to an embodiment.

That is, according to the embodiment of the invention, the IRI and CC packets are provided with a session identifier for identifying the communication session to be intercepted (between, eg., one of the communication processes of an end terminal (e.g., Mobile Station, MS) and a network Access Point, AP) and packet order numbers for ordering the packets in the correct time order. FIG. 2 shows schematically an example for an IRI or CC packet. Here, a frame has been generated and the session identifier and the packet order number has been inserted in the header of the frame, besides further control data like the address etc. Optionally, also a time stamp can be provided in the header of the packets. The packet body comprises the actual intercepted data.

Figure 3:
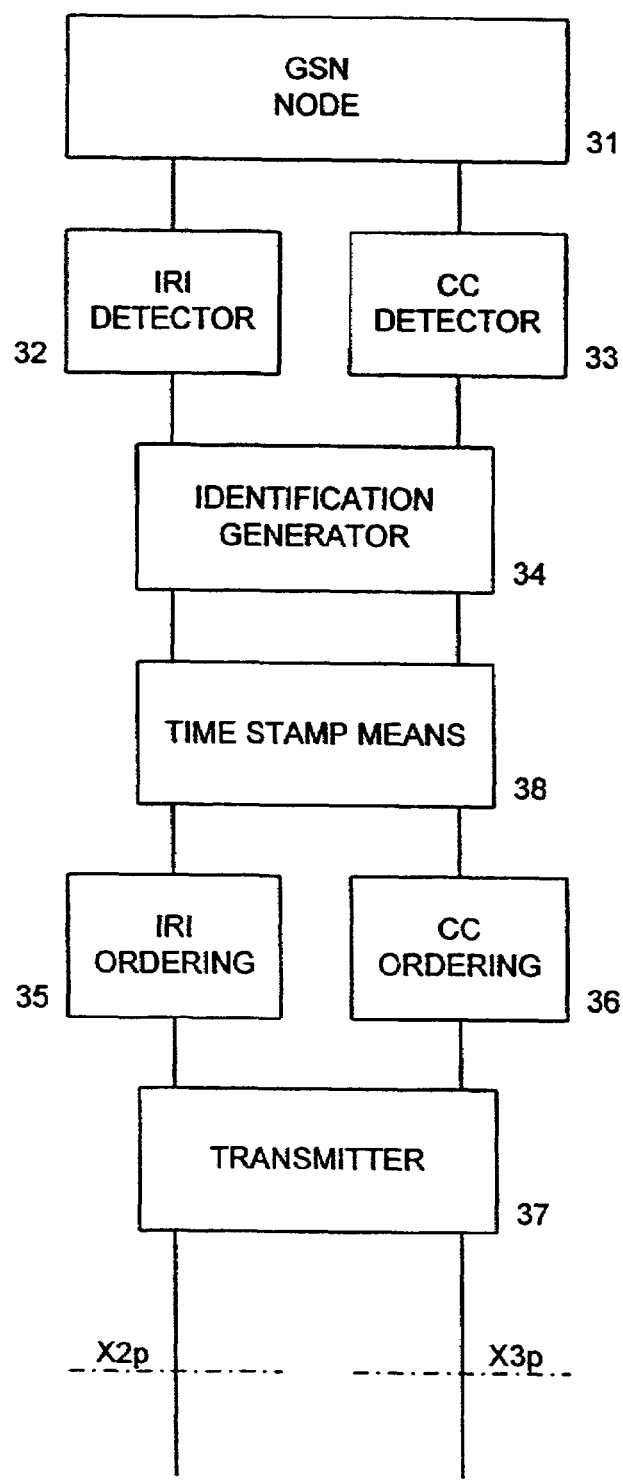
FIG. 3 shows parts of the interception node according to the embodiment.

FIG. 3 shows the interception node (GSN, i.e., GPRS Support Node) 3 in more detail. It is noted that this can be a SGSN (Serving GPRS Support Node), a GGSN (Gateway GPRS Support Node) or any other suitable node which can be used for incorporating an interception function therein. Reference numerals 31 denotes the GSN node itself, which is adapted to intercept a communication performed via the corresponding GPRS (packet switched) network. Reference numerals 32 and 33 denote an IRI detector and a CC detector, respectively.

The IRI detector 32 is adapted to detect the necessary interception related information associated to the communication to be intercepted and creates data packets (as shown in FIG. 2) in which the interception related information (IRI) is included in the user data and in which the header provides room for the session identifier and the order number.

Likewise, the CC detector 32 is adapted to detect the communication contents of the communication to be intercepted and creates data packets (as shown in FIG. 2) in which the communication data is included in the user data (e.g. intercepted IP packet header and payload contents) and in which the header provides room for the session identifier and the order number.

An identifier generator 34 is provided to set a session identifier (identification number) in the corresponding header field of the CC and IRI packets. In ETSI ES 201 671 v1.1.1 a similar parameter is the Call Identifier (CID), consisting of the Network Identifier (NID) and the Call Identity Number (CIN). The CIN identifies uniquely one logical network communication link between an user terminal and an other communication party behind or in a network. Thus, this identifier according to the PDP context can be used for the session identifier. However, also other identifiers are possible, for example, an arbitrary number could be used.

Reference numerals 35 and 36 denote IRI and CC ordering means. These ordering means generate ordering numbers for the IRI and CC packets. In particular, when a new session to be intercepted starts, the order number for both packets is reset to 0. Then, for each new packet of both kinds, this order number is incremented, such that a row of IRI packets IRI0, IRI1, ..., IRIn and a row of CC packets CC0, CC1, ..., CCm are created. It should be noted that the order numbers for both kinds of packets are independent. That is, there is an IRI order number and a CC order number. There can be more CC packets than IRI packets, that is, n<m, or vice versa.

Reference numeral 37 denotes a transmitter which transmits the CC packets and the IRI packets via the network to the LEA 1.

According to this embodiment, also a time stamp means 38 is provided. This time stamp means 38 provides a time stamp having, e.g., the precision of a second into the header of the frame of the CC and IRI packets. In principle, the time stamp means 38 can be connected to every part of the interception node 3, as long as the time stamp can be provided before transmitting the IRI and CC packets. However, preferably the time stamp means 38 is provided between the identifier generator 34 and the IRI and CC ordering means 35 and 36.

Figure 4:
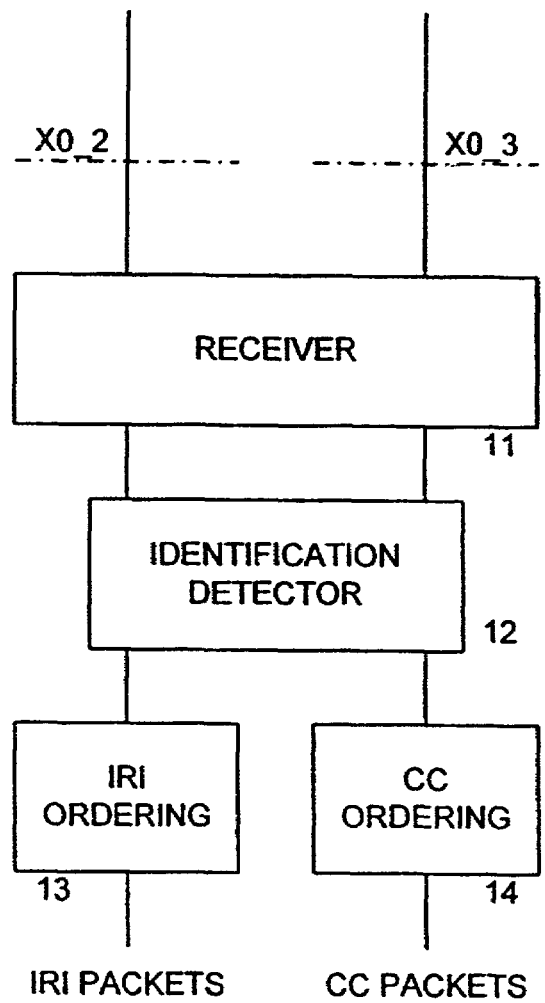
FIG. 4 shows parts of the LEA according to the embodiment.

The IRI and CC packets are transmitted, via the packet switched network, to the Law Enforcement Agency (LEA) device 1. The parts of the LEA 1 relating to the preferred embodiment of the invention are shown in FIG. 4. The IRI packets and the CC packets are received via the interfaces X0_2 and X0_3, respectively, by a receiver 11. Due to the further control data (i.e., address data) the receiver 11 is able to distinguish between the IRI and CC packets. An identifier detector 12 is adapted to detect the session identifier according to the communication to be intercepted, such that all packets related to one communication session can be arranged together. The ordering of the IRI packets and CC packets in the correct time order is performed by the IRI and CC packets 13 and 14, optionally by taking into account the time stamp.

For rearranging the received packets, the ordering means 13 and 14 should have a suitable memory, i.e., a RAM with a large capacity. If there will be likely less IRI packets than CC packets, the RAM needed for the IRI ordering means 13 can be smaller than that of the CC ordering means 14.

Thus, the IRI packets and the CC packets can be output in the correct time order and in correct correlation to each other. That is, for each communication session, CC packets and IRI packets can be investigated in the correct order.

The method according to the invention is described in the following with respect to the flowcharts shown in FIGS. 5 to 7.

Figure 5:
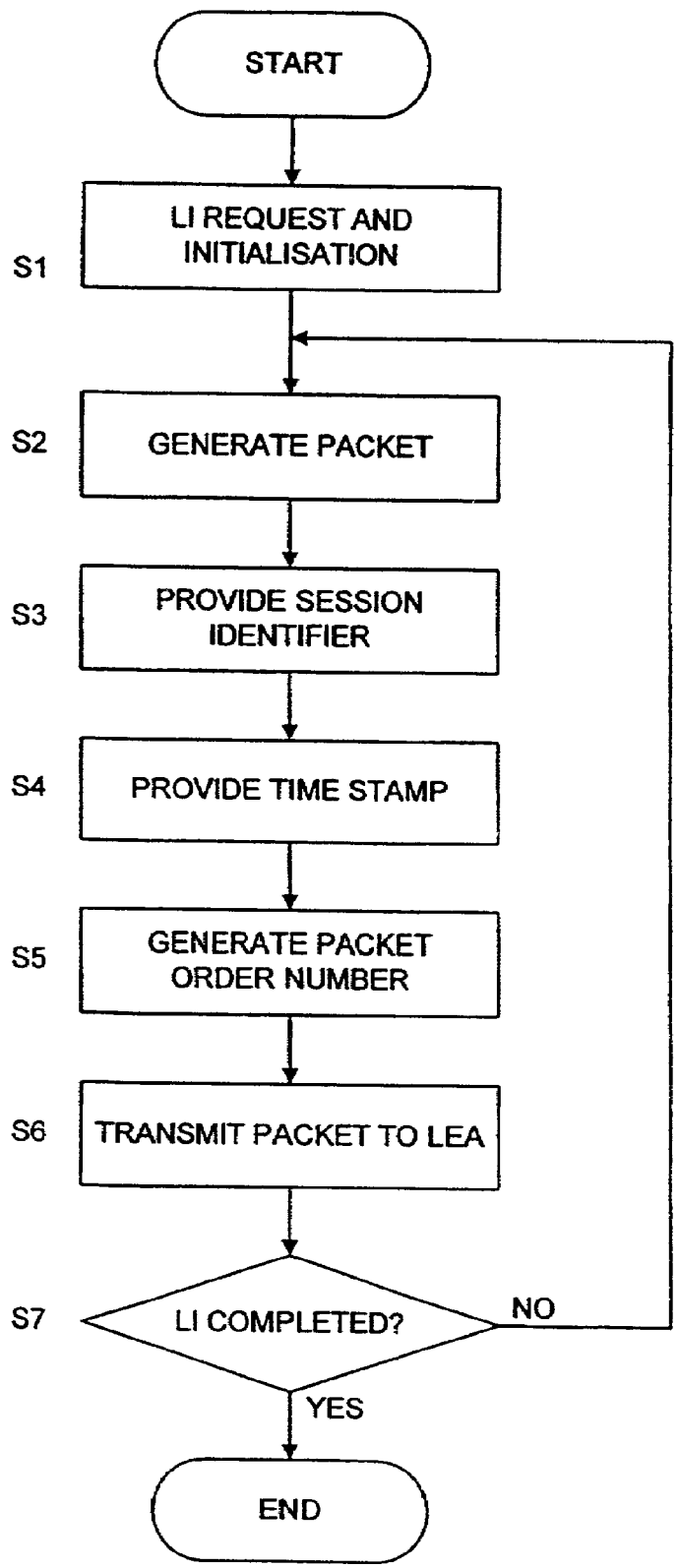
FIG. 5 shows a flowchart of a process for synchronising IRI packets and CC packets according to the embodiment.
Figure 6:
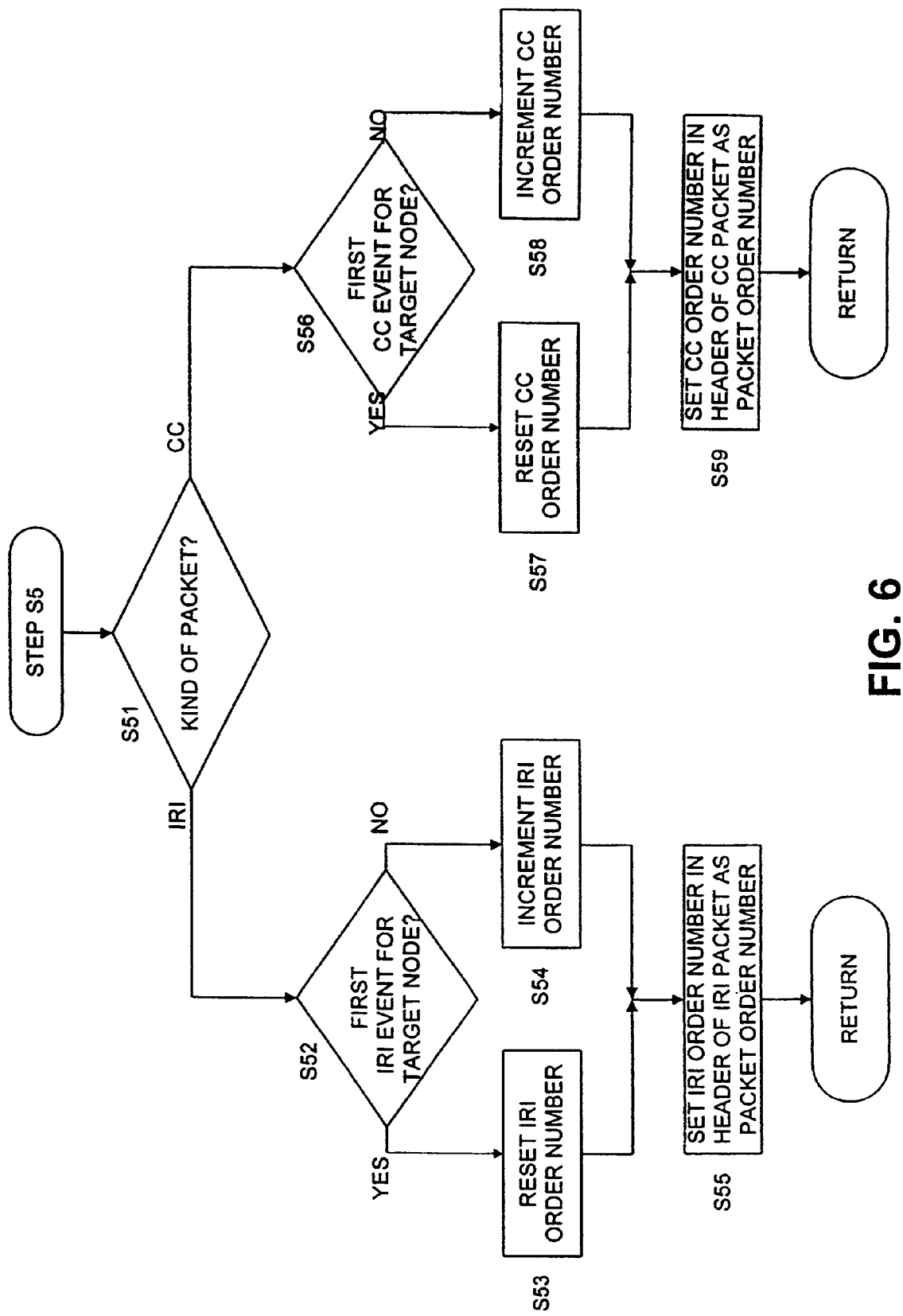
FIG. 6 shows a flowchart of a routine performed in step S6 of FIG. 5.

FIG. 5 shows a process for synchronising IRI and CC packets according to the invention. In step S1, an LI (Lawful Interception) request is issued by the LEA 1. This request is transmitted via the interface X0_1, the ADMF 2_1 and the interface X1_1p shown in FIG. 1 to the interception node (GSN) 3. In step S1, the process is started and initialised. In particular, ordering numbers used for IRI and CC packets are reset, that is, the IRI order number is reset to 0 and the CC order number is reset to 0.

The following steps S2 to S7 are repeated for every packet which is generated during the interception.

In step S2, a packet is generated, which can either be an IRI packet or a CC packet. As mentioned above, the IRI packet contains information related to the interception, which could be e.g., telephone number, Lawful Interception Identifier (LIID), which is agreed between LEA and the NMO/AP/SvP (see e.g. ES 201 671 v1.1.1) etc., whereas the CC packet contains at least the content of the actual communication which is intercepted. In steps S2, also the data frame as shown in FIG. 2 is generated.

In step S3, a session identifier is provided. According to this embodiment, the PDP context in GPRS is used for determining the session identifier, as described above.

In step S4, a time stamp is provided. As described above, this step is optional and can be left out, if not necessary. If used, the time stamp is provided in the corresponding field of the header of the CC or IRI packet as shown in FIG. 2.

In step S5, the packet order number is generated. In principle, this is performed by incrementing a general order number during each loop and taking the current value of this order number as the packet order number. It is noted that there have to be two independent order numbers, one for IRI packets and one for CC packets. The process carried out in this step is later on described in more detail with respect to FIG. 6.

In step S6, the packet is transmitted to the LEA via the network by using the interfaces as shown in FIG. 1.

In step S7 it is investigated whether the current Lawful Interception (LI) is completed or whether it has to be continued. If the interception is to be continued, the process returns to step S2. If the current LI is to be completed (i.e., a request for ending the current LI has been received), the process is ended.

Next, a routine to generate the packet order number carried out in step S5 is described in more detail. First, in step S51, it is distinguished whether the packet in question is an IRI packet or a CC packet. Since the following operations for the IRI packets and the CC packets basically correspond to each other, only steps S52 to S55 with respect to IRI packets are describe in order to simplify the description. In step S52 it is determined whether the first IRI event (see GSM 03.03. for GPRS) for a session has been generated by the intercepting node. If so, the routine advances to step S53 in which the IRI number is reset to 0. If the time stamp is unchanged, the IRI order number is incremented in step S54. In step S55, the IRI order number is taken as the packet order number and set in the header of the IRI packet (cf. FIG. 2). After that, the routine returns to the process shown in FIG. 5.

In case the actual packet is a CC packet, steps S56 to S59 are carried out in a similar manner as that according to steps S52 to S55. Hence, a further description thereof is omitted.

Figure 7:
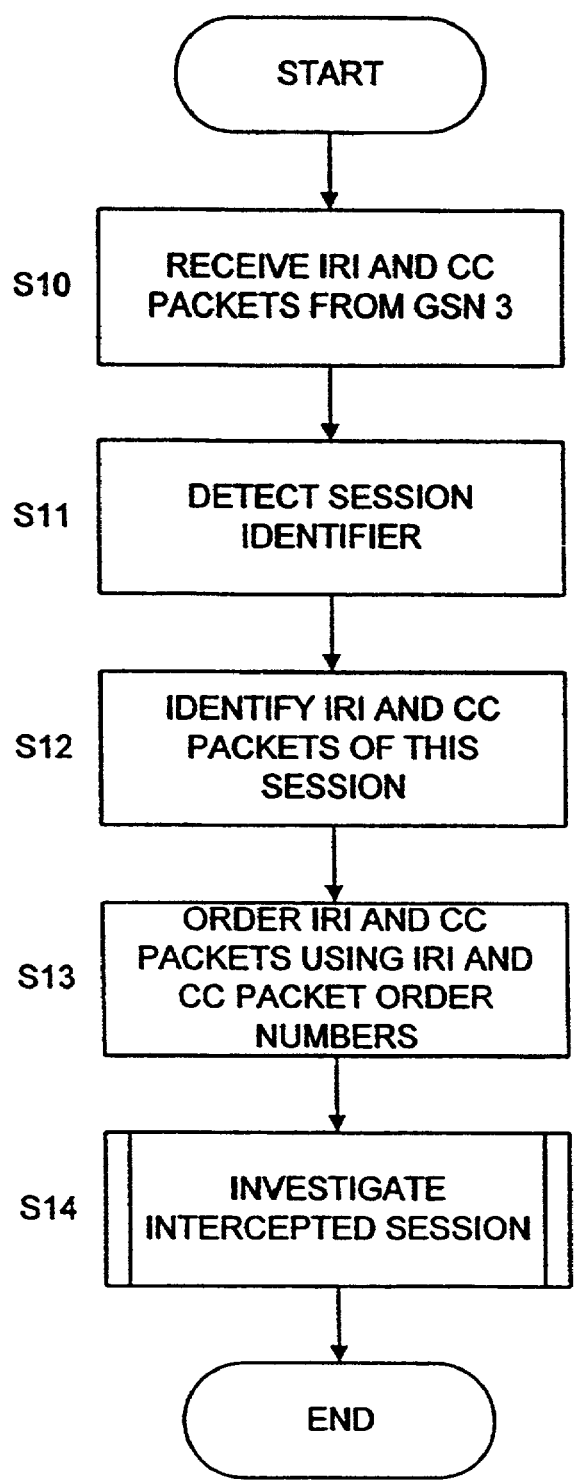
FIG. 7 shows a flowchart of a process for receiving the IRI and CC packets according to the embodiment.

Next, the process carried out by receiving the CC packets and the IRI packets by the LEA 1 is described with respect to FIG. 7.

In step S10, the IRI and CC packets from the GSN 3 (i.e., the interception node) are received via the interface X0_2 and X0_3, respectively. In step S11, the session identifier which indicates the communication session intercepted is detected. This is performed by reading the corresponding value from the header of the packet, as shown in FIG. 2. Then, the IRI packets and the CC packets associated to the session identified by the session identifier are distinguished in step S12.

Then, in step S13 the packets associated to this session are arranged in the correct time order. This is effected by detecting the corresponding IRI or CC order number in the header of the packet and by arranging the packets according to the order numbers.

Finally, the communication session intercepted which is represented by the sequence of CC packets can be investigated in step S14. That is, a recording of this communication, a search for key words or the like, etc. may be performed.

As an alternative to the above-described embodiment, the providing of the session identifier could be modified. Often it could be that there are much more CC packets than IRI packets. Hence, according to this modification, the IRI packets could be provided with a reference number to the previous CC packet generated before the IRI packet. (other alternative is that the CC packets would have reference number to the last IRI packet generated by this node for this session.) In this case, the time stamp might be even omitted. Nevertheless, both CC and IRI packets could be provided with the session identifier, which could be derived from, e.g., the PDP context, and Node ID in GPRS.

As a further alternative of the above-described preferred embodiment, the elements shown in FIG. 4 could also be incorporated in the ADMF 2_1, the IRI delivery function means 2_2 and the CC delivery function means 2_3 such that arranging of the CC and IRI packets in the correct order is already performed in the DF (delivery function) which is provided by the means 2_1 to 2_3. This reduces the load for the LEA. Furthermore, an LEA not having the means shown in FIG. 4 can easily be supplied with ordered data.

It is noted that the term communication session does not only refer to an active communication, but also to a case where a mobile station is passive, i.e., in which the mobile station only waits for an answer but is connected to the network.

In the following, a second embodiment is described.

As mentioned above, the IRI packets and/or the CC packets are provided with sequence numbers. The maximum sequence number is preferably chosen so high that normal communication can be intercepted without an overflow of the sequence numbers.

However, there might occur situations in which the numbers are getting so high that an overflow takes place. For example, this can happen in the case where a mobile station is permanently online. For example, a bottle vending machine could have a permanent connection to a central point. In this case, it should be possible to distinguish between packets having sequence numbers before the overflow and packets having sequence numbers after the overflow. In the first embodiment, this situation is handled by the flag.

However, according to the second embodiment, the flag is replaced by another indication. For example, the indication could be a colour. That is, a first row of packets can be assigned the colour "green". Then, in case an overflow takes place, the packets with the new numbers can be assigned the colour "blue". Thus, the packets of the row before the overflow can easily be distinguished from packets having numbers after the overflow, although the new sequence numbers are smaller than the old sequence numbers. That is, the "green" packets can easily be recognised as old packets (generated before the overflow), whereas the "blue" packets can easily be recognised as new packets (generated after the overflow).

As an alternative, the old packets could also be assigned with a different colour, e.g., "red". By this measure, it is clear that an overflow has taken place and that these packets are old packets.

If then another overflow takes place, the situation is reversed, such that now the old packets are "green" and the new packets are "blue". In this way, the provision of the packets can be continued endlessly.

It is to be understood that the indication by colours is only an example for the overflow indication. There are also other forms of indications possible, for example predetermined integer values, characters or the like. It is also possible to provide a flag for distinguishing between old and new packets, and to provide an extra flag in case an overflow has taken place. This extra flag could be reset in case no more old packets are present.

The above described embodiment can be preferably used in the structure and method according to the first embodiment and modifications thereof. However, the second embodiment is not limited thereto. In particular, it is not limited to the above structure of two different data packets (i.e., IRI and CC packets) according to the first embodiment.

The measure according to the second embodiment can also be applied to a data packets of a single kind which have to be put in an order.

The above description and accompanying drawings only illustrate the present invention by way of example. Thus, the embodiments of the invention and the modifications thereof may vary within the scope of the attached claims. For example, the embodiments and the modifications thereof can be combined.

The invention claimed is:

1. A method for performing a lawful interception in a packet network, comprising:
    generating interception related information packets from a communication or network activity to be intercepted; and/or
    generating communication content packets from said communication or network activity to be intercepted;
    providing identification data for said interception related information packets and/or for said communication content packets of one group of communication content packets;
    providing ordering data for each of said interception related information data packets and/or for each of said communication content packets which are generated in the generating step;
    transmitting said interception related information packets, said communication content packets, said identification data and said ordering data to an interception authority device; and
    providing a frame for each interception related information packet and each communication content packet, in which said identification data and said ordering data is included.

2. The method according to claim 1, further comprising:
    using said identification data for identifying interception related information packets and for said communication content packets of said one group of communication content packets; and
    using said ordering data for ordering said interception related information packets and said communication content packets.

3. The method according to claim 1, wherein said identification data is a session identification data.

4. The method according to claim 3, wherein said packet network is a general packet radio system network and said session identification is data obtained from a packet data protocol context in general packet radio system.

5. The method according to claim 1, wherein said ordering data are integer numbers which are incremented for each sequential packet.

6. The method according to claim 1, further comprising providing a time stamp to each interception related information packet and/or to each communication content packet.

7. The method according to claim 1, further comprising:
    providing a time stamp to each interception related information packet and/or to each communication content packet; and
    arranging said time stamp in said frame.

8. The method according to claim 1, wherein said ordering data are such that an overflow thereof is possible, and
    said method further comprises
    providing a packet group indication to each interception related information packet and/or to each communication content packet for distinguishing between the group of packets before said overflow and the group of packets after said overflow.

9. An interception system for packet networks, comprising:
- at least one first network element for intercepting a communication; and
- at least one interception authority device;
- wherein said first network element comprises:
  - a first packet generator configured to generate interception related information packets from a communication or network activity to be intercepted, and to provide a frame for each interception related information packet; and/or
  - a second packet generator configured to generate communication content packets from said communication or network activity to be intercepted, and to provide a frame for each communication content packet;
  - an identification data generator configured to generate an identification data for said interception related information packets and/or said communication content packets associated to said communication;
  - an ordering data generator configured to provide ordering data for each of said interception related information data packets and/or each of said communication content packets which are generated by said first and/or second packet generating means; and
  - a transmitter configured to transmit said interception related information packets and said communication content packets, said identification data and said ordering data to said interception authority device;
  - wherein said identification data generator is configured to include said identification data and said ordering data in each frame.

10. The system according to claim 9, wherein said interception authority device comprises:
- a receiver configured to receive said interception related information packets and said communication content packets including said identification and said ordering data;
- an identification detector configured to identify interception related information packets and communication content packets associated to said one communication; and
- a packet ordering unit configured to order said interception related information packets and/or said communication content packets according to said ordering data.

11. The system according to claim 10, wherein said identification data is a session identification data.

12. The system according to claim 11, wherein said network is a general packet radio system network and said identification data generator of said first network element is adapted to detect said session identification data from a packet data protocol context.

13. The system according to claim 9, wherein said ordering data are integer order numbers and said ordering data generator is configured to increment the order number for each sequential packet.

14. The system according to claim 9, wherein said first network element further comprises:
- a time stamp generator connected between said identification data generator and said ordering data generator, for providing a time stamp to each interception related information packet and/or to each communication content packet.

15. The system according to claim 9, wherein said first network element further comprises
- a time stamp generator configured to provide a time stamp to each interception related information packet and/or to each communication content packet, wherein
- said time stamp generator is configured to include said time stamp into each of said frames.

16. The system according to claim 9, further comprising
- an interception related information packets delivering device configured to deliver said interception related information packets from said first network element to said interception authority device;
- a communication content packets delivering device configured to deliver said communication content packets from said first network element to said interception authority device; and
- a packet delivering control device;
- wherein said packet delivering control device is configured to identify said interception related information packets and said communication content packets associated to said one group of communication content packets on the basis of said identification data, and to order said interception related information packets and said communication content packets on the basis of said ordering data.

17. The system according to claim 9, wherein said ordering data are such that an overflow thereof is possible, and
- said system further comprises a packet group distinguisher for providing a packet group indication to each interception related information packet and/or to each communication content packet for distinguishing between the group of packets before said overflow and the group of packets after said overflow.

18. An apparatus for performing a lawful interception in a packet network, said apparatus comprising:
- means for generating interception related information packets from a communication or network activity to be intercepted and for providing a frame for each interception related information packet; and/or
- means for generating communication content packets from said communication or network activity to be intercepted and for providing a frame for each communication content packet;
- means for providing identification data for said interception related information packets and/or for said communication content packets of one group of communication content packets and for including the identification data in each frame;
- means for providing ordering data for each of said interception related information data packets and/or for each of said communication content packets which are generated by said means for generating communication content packets and for including the ordering data in each frame; and
- means for transmitting said interception related information packets and/or said communication content packets, said identification data and said ordering data.

19. The apparatus according to claim 18, wherein said means for transmitting transmits said interception related information packets and/or said communication content packets, said identification data and said ordering data to an interception authority device.

20. The apparatus according to claim 19, wherein said apparatus is a network element.

21. The apparatus according to claim 20, wherein the network element is a serving general packet radio system support node.

22. The apparatus according to claim 20, wherein the network element is a gateway general packet radio system support node.

23. An apparatus for performing a lawful interception in a packet network, said apparatus comprising:
- a detector configured to detect interception related information associated to the communication to be intercepted and creates data packets, in which said interception related information is included, wherein the detector is configured to provide a frame for each data packet;
- an identifier generator, configured to provide identification data for said interception related information packets and to include said identification data in each frame;
- an ordering device, configured to provide ordering data for each of said interception related information data packets which are generated by the detector; and
- a transmitter, configured to transmit said interception related information packets, said identification data and said ordering data;
- wherein the identification data generator is further configured to include said ordering data in each frame.

24. The apparatus according to claim 23, wherein said transmitter is configured to transmit interception related information packets, said identification data and said ordering data to an interception authority device.

25. The apparatus according to claim 23, wherein said apparatus is a network element.

26. The apparatus according to claim 25, wherein the network element is a serving general packet radio system support node.

27. The apparatus according to claim 25, wherein the network element is a gateway general packet radio system support node.

28. An apparatus for performing a lawful interception in a packet network, said apparatus comprising:
- a detector configured to detect interception communication contents of a communication to be intercepted and creates data packets, in which said communication contents are included, wherein the detector is configured to provide a frame for each data packet;
- an identifier generator, configured to provide identification data for said communication content data packets and to include said identification data in each frame;
- an ordering device, configured to provide ordering data for each of said communication content data packets which are generated by the detector; and
- a transmitter, configured to transmit said communication content data packets, said identification data and said ordering data;
- wherein the identification data generator is further configured to include said ordering data in each frame.

29. The apparatus according to claim 28, wherein said transmitter is configured to transmit said communication content data packets, said identification data and said ordering data to an interception authority device.

30. The apparatus according to claim 28, wherein said apparatus is a network element.

31. The apparatus according to claim 30, wherein the network element is a serving general packet radio system support node.

32. The apparatus according to claim 30, wherein the network element is a gateway general packet radio system support node.

33. An apparatus for performing a lawful interception in a packet network, said apparatus comprising:
- a receiver, which receives packets, comprising interception related information packets and/or communication content packets, identification data and ordering data of an intercepted communication, wherein a frame for each interception related information packet and each communication content packet is provided, in which said identification data and said ordering data is included;
- an identifier detector, configured to detect the identification data identifying packets that belong to the intercepted communication; and
- an ordering device configured to order the received interception related information packets and/or communication content packets based to the ordering data.

34. The apparatus according to claim 33, wherein said apparatus is a Law Enforcement Agency device.

* * * * *

UNITED STATES PATENT AND TRADEMARK OFFICE
CERTIFICATE OF CORRECTION

| | | |
|---|---|---|
| PATENT NO. | : 7,310,331 B2 | Page 1 of 1 |
| APPLICATION NO. | : 10/083680 | |
| DATED | : December 18, 2007 | |
| INVENTOR(S) | : Sjoblom | |

It is certified that error appears in the above-identified patent and that said Letters Patent is hereby corrected as shown below:

In column 11, line 25, claim 9, line 25
"generating means" should be -- generator --

In column 11, line 47, claim 11, line 1
"10" should be -- 9 --

In column 12, line 63, claim 20, line 1
"19" should be -- 18 --

Signed and Sealed this

Fifteenth Day of July, 2008

JON W. DUDAS
*Director of the United States Patent and Trademark Office*